US012422278B2

(12) United States Patent
Schaefer

(10) Patent No.: US 12,422,278 B2
(45) Date of Patent: Sep. 23, 2025

(54) POINT CLUSTERING BASED ON ROADWAYS

(71) Applicant: Toyota Jidosha Kabushiki Kaisha, Toyota (JP)

(72) Inventor: Alexander Christoph Schaefer, Fremont, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 87 days.

(21) Appl. No.: 18/427,310

(22) Filed: Jan. 30, 2024

(65) Prior Publication Data

US 2025/0244145 A1    Jul. 31, 2025

(51) Int. Cl.
*G01C 21/00* (2006.01)

(52) U.S. Cl.
CPC ..... *G01C 21/3874* (2020.08); *G01C 21/3848* (2020.08)

(58) Field of Classification Search
CPC ............ G01C 21/3874; G01C 21/3848
USPC .......................................... 701/533
See application file for complete search history.

(56) References Cited

U.S. PATENT DOCUMENTS

| 11,566,906 | B2 | 1/2023 | Mubarek et al. |
| 11,698,272 | B2 | 7/2023 | Kroepfl et al. |
| 2017/0327123 | A1* | 11/2017 | Tokimasa ............... B60R 21/00 |
| 2018/0231387 | A1* | 8/2018 | Thiel .................. G01C 21/3811 |
| 2018/0292224 | A1* | 10/2018 | Brodski ............... G08G 1/0112 |
| 2019/0137289 | A1* | 5/2019 | Annamalai ........ G01C 21/3415 |
| 2020/0272833 | A1* | 8/2020 | Jiang .................. G01C 21/3815 |
| 2021/0063200 | A1* | 3/2021 | Kroepfl ............. G01C 21/3867 |
| 2021/0095975 | A1* | 4/2021 | Mubarek .............. G08G 1/0141 |
| 2021/0096573 | A1* | 4/2021 | Yu ........................ G05D 1/0219 |
| 2024/0192019 | A1* | 6/2024 | Schaefer ............ G01C 21/3815 |

\* cited by examiner

*Primary Examiner* — Muhammad Shafi
(74) *Attorney, Agent, or Firm* — Christopher G. Darrow; Darrow Mustafa PC

(57) ABSTRACT

Systems, methods, and other embodiments described herein relate to grouping a plurality of points, such as trace points, in a region into one or more clusters based on one or more roadways. In one embodiment, a method includes connecting, using a plurality of edges, the plurality of points in the region, based on at least one predetermined criterion, to form a frame graph. The method includes generating a road graph based on the frame graph. The road graph identifies the one or more roadways in the region. The method includes grouping one or more of the plurality of points into the one or more clusters based on at least one second predetermined criterion. Each of the one or more clusters is associated with one of the one or more roadways.

20 Claims, 5 Drawing Sheets

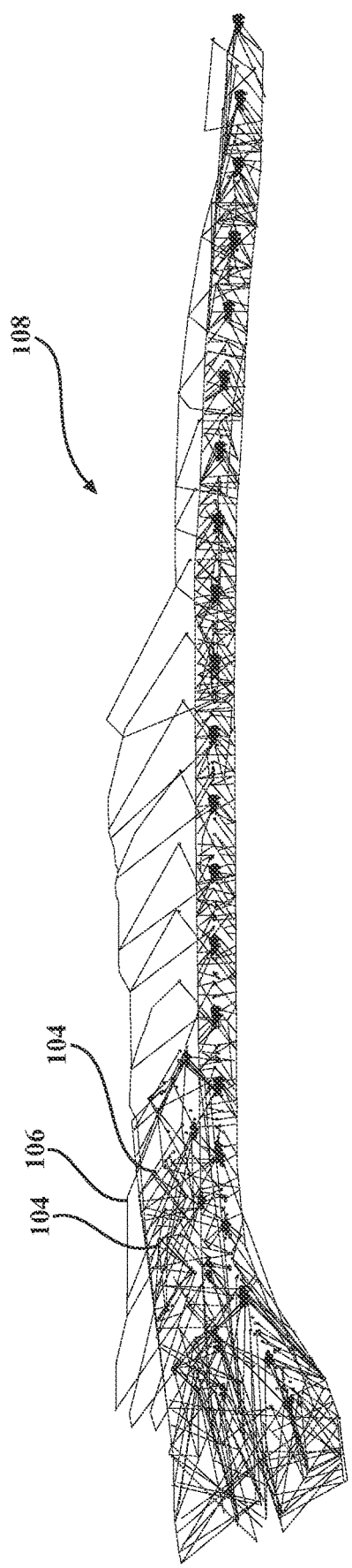
FIG. 1C
FIG. 1D

POINT CLUSTERING BASED ON ROADWAYS

TECHNICAL FIELD

The subject matter described herein relates, in general, to systems and methods for grouping a plurality of points, such as trace points, into clusters based on one or more roadways.

BACKGROUND

Points, such as trace points, include sensor information about a road. However, for points distributed over a region of interest, where the region of interest includes multiple roads side-by-side, it may be difficult to discern which road the points are associated with. Processing a point map in which the points have not been associated with a road can be both labor and resource intensive and inaccurate.

SUMMARY

In one embodiment, a system for grouping a plurality of points into clusters is disclosed. The system includes a processor and a memory in communication with the processor. The memory stores machine-readable instructions that, when executed by the processor, cause the processor to connect, using a plurality of edges, a plurality of points in a region, based on at least one predetermined criterion, to form a frame graph. The machine-readable instructions further include machine-readable instructions that, when executed by the processor, cause the processor to generate a road graph based on the frame graph. The road graph identifies one or more roadways in the region. The machine-readable instructions further include machine-readable instructions that, when executed by the processor, cause the processor to group one or more of the plurality of points into one or more clusters based on at least one second predetermined criterion. Each of the one or more clusters is associated with one of the one or more roadways.

In another embodiment, a method for grouping a plurality of points into clusters is disclosed. The method includes connecting, using a plurality of edges, a plurality of points in a region, based on at least one predetermined criterion, to form a frame graph. The method further includes generating a road graph based on the frame graph. The road graph identifies one or more roadways in the region. The method further includes grouping one or more of the plurality of points into one or more clusters based on at least one second predetermined criterion. Each of the one or more clusters is associated with one of the one or more roadways.

In another embodiment, a non-transitory computer-readable medium for grouping a plurality of points into clusters is disclosed. The non-transitory computer-readable medium includes instructions that, when executed by a processor, cause the processor to perform one or more functions. The instructions include instructions to connect, using a plurality of edges, a plurality of points in a region, based on at least one predetermined criterion, to form a frame graph. The instructions include instructions to generate a road graph based on the frame graph. The road graph identifies one or more roadways in the region. The instructions include instructions to group one or more of the plurality of points into one or more clusters based on at least one second predetermined criterion. Each of the one or more clusters is associated with one of the one or more roadways.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 1A-1F illustrate an example of grouping a plurality of points into clusters based on one or more roadways.

DETAILED DESCRIPTION

Figure 1A:
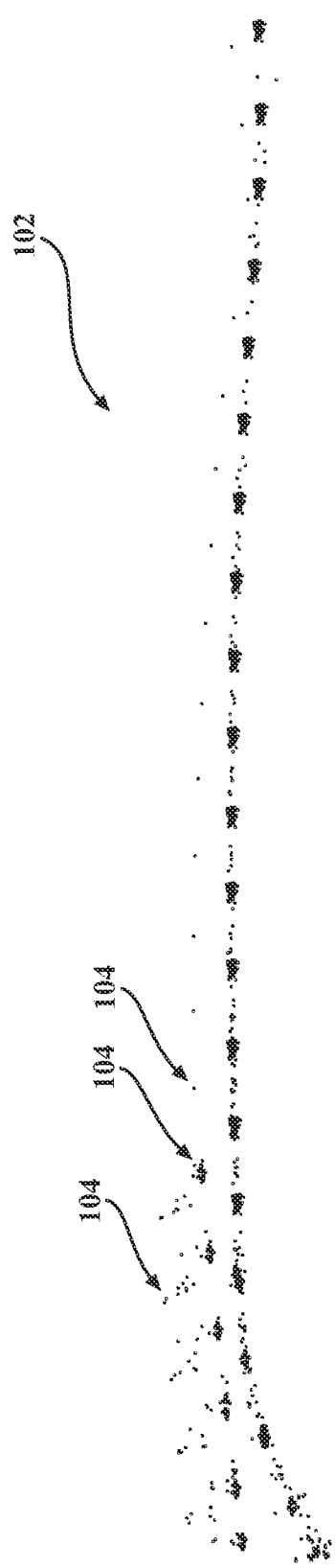

Systems, methods, and other embodiments associated with systems and methods for grouping a plurality of points, such as trace points, into clusters based on one or more roadways are disclosed. Points may originate from sensor data and the points include information about a particular point in a region of interest. More specifically, the points represent observations of a roadway. A point may have metadata that includes a geographical location and various environmental conditions associated with the geographical location. The environmental conditions may include an elevation level, a humidity level, a temperature level, a road gradient level, and/or a light level. Points are useful for vehicle navigation, orientation, autonomous driving, pedestrian movement, and/or cycle movement. However, points that are not grouped into clusters and associated with a roadway are more difficult to utilize. Systems providing services such as navigation services can provide more accurate information since the points being used belong to one roadway and are not being diluted by points belonging to other roadways. Such systems can more easily utilize points that have been linked to a particular roadway to distinguish between roads at various elevation levels and/or roads separated by markings or a physical barrier. As such, mapping systems may rely on accurate points-to-road clustering.

Current methods of grouping a plurality of points into clusters based on one or more roadways can be labor-intensive, time-consuming, expensive, and require extensive storage and computational resources as the prior art discloses ingesting aerial maps and manually annotating the aerial maps. These methods can be resource-intensive, time-consuming, expensive, and have high levels of inaccuracies.

Accordingly, systems, methods, and other embodiments associated with grouping a plurality of points into clusters based on one or more roadways are disclosed. The system receives a plurality of points located within a region of interest. The system may initially connect the points based on a predetermined criterion such as two points being neighbors. The system may connect each two points using an edge. The system may discard the edges connecting points that do not meet additional predetermined criteria such as two points originating from one sensor. In other words, the system may discard edges between points that do not originate from a single sensor. The system may further discard edges between points that are over a predetermined distance from each other.

The system may generate the frame graph, which includes the points and the edges, based on the points meeting predetermined criteria. The system may then extract a road graph from the frame graph using any suitable method. As an example, the system may extract the road graph from the frame graph using an image skeletonization technique. The road graph indicates the roadways in the region.

The system may then associate the points to one of the roadways based on the proximity between the points and the roadways. As an example, proximity may refer to Euclidean distance and/or the length of the shortest path through the frame graph. The system may then group points associated with each roadway into a separate cluster and may output or transmit the clusters to another entity such as a navigation database.

The embodiments disclosed herein present various advantages over conventional technologies. First, the embodiments can provide a more accurate prediction of the characteristics of the roadways, merging roads, splitting roads, and intersections. Second, the embodiments are less resource-intensive, more cost effective, and more time effective than the prior art.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIGS. 1A-1F illustrate an example of grouping a plurality of points into clusters based on one or more roadways. A cluster generating system 100 receives sensor data 102 from any suitable sensors. As an example, the cluster generating system 100 may receive sensor data 102 from mobile sensors such as vehicle sensors and/or stationary sensors such as roadside sensors or infrastructure sensors.

As an example and as shown in FIG. 1A, sensor data 102 includes points 104. The points 104 are distributed within a region. The points 104 may have metadata that includes details such as the source of sensor data 102, geographical location in terms of coordinates, and environmental conditions such as elevation levels, light levels, humidity levels, temperature levels, and/or precipitation levels. The points 104 may be trace points which identify the positions of a vehicle travelling along a roadway. As an example, each point 104 may indicate a position of a vehicle along the roadway when the sensor data 102 is captured. The points 104 may originate from a single vehicle travelling along a roadway. Alternatively, the points 104 may originate from two or more vehicles travelling along one or more roadways.

The sensor data 102 may include left key points, which identify a left boundary of a roadway that the vehicle is traveling on and right key points, which identify a right boundary of the roadway that the vehicle is traveling on. Each point 104 may be the center of the roadway. More specifically, each point 104 may be the center point between a left key point and a right key point. As another example, the sensor data 102 may include a field of view and each point 104 may be a centroid of the field of view. As an example, each point 104 may be a Toyota Safety Sense™ field of view centroid.

Figure 1B:
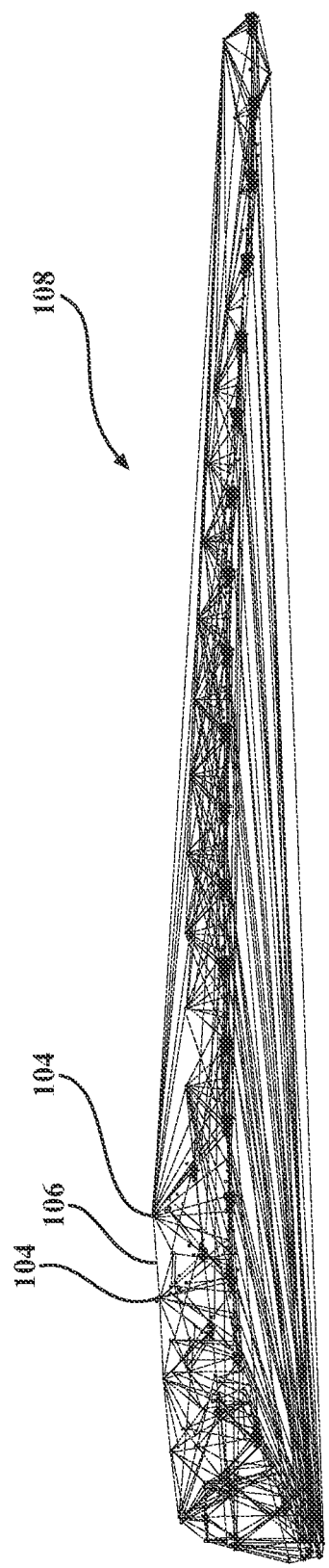

FIGS. 1B-1D illustrate an example of connecting, using edges 106, the points 104 in the region, based on at least one predetermined criterion, to form a frame graph 108. The cluster generating system 100 may connect the points 104 using an edge 106 between each two points 104. As an example and as shown in FIG. 1B, the cluster generating system 100 may connect the points 104 based on the Delaunay triangulation, which is a triangulation in which no point is inside the circumcircle of any triangle in the Delaunay triangulation. As an example, the predetermined criterion may include two points 104 being neighbors, two points 104 being proximate to each other, and/or two points 104 being within a predetermined radius. In the example of the predetermined criterion including two points 104 being neighbors, the cluster generating system 100 may connect each two points 104 that do not have any intervening points between the two points 104. In the example of the predetermined criterion including two points 104 being proximate to each other, the cluster generating system 100 may connect each two points 104 that are proximate to each other and within a certain distance from each other. In the example of the predetermined criterion including two points 104 being within a predetermined radius, the cluster generating system 100 may connect each two points 104 that are within a predetermined radius from a point 104. The predetermined criterion may include two points 104 having a common vehicle source, two points 104 having a distance from each other that is less than a predetermined distance, two points 104 having a gradient between each other that is less than a predetermined percentage, two points 104 having fields of view that have an altitude difference that is less than a predetermined height, and two points 104 having fields of view that have an overlapping portion and the overlapping portion is more than a predetermined value.

In the example of the predetermined criterion including two points 104 that have a common vehicle source, the cluster generating system 100 may retain the edges 106 between two points 104 that originated from a single vehicle or a single vehicle sensor and may discard the edges 106 between two points 104 that do not share a common source. To further explain, the cluster generating system 100 may initially connect the points 104 based on the neighboring points 104 and/or the Delaunay triangulation, and then the cluster generating system 100 may discard the edges 106 that do not meet the criterion of two points 104 having a common vehicle source.

In the example of the predetermined criterion including two points 104 having a distance from each other that is less than a predetermined distance, the cluster generating system 100 may retain the edges 106 between two points 104 that are less than a predetermined distance, e.g., 50 meters, away from each other and discard edges 106 connecting two points 104 that are equal to or more than the predetermined distance. The cluster generating system 100 may measure the distance between the two points 104 based on the geographic coordinates of the two points 104.

In the example of the predetermined criterion including two points 104 having a gradient between each other that is less than a predetermined percentage, the cluster generating system 100 may retain the edges 106 between two points 104 that have a gradient that is less than the predetermined percentage, e.g., 10%, and discard edges 106 connecting two points 104 that are equal to or more than the predetermined percentage.

In the example of the predetermined criterion including two points 104 having fields of view that have an altitude difference that is less than a predetermined height, the cluster generating system 100 may retain the edges 106 between two points 104 that have less than the predetermined height difference, e.g., 0.5 meters, and discard edges 106 connecting two points 104 that have equal to or more than the predetermined height difference. In this example, the cluster generating system 100 may compare the fields of view of the two points 104 and may use any suitable method to determine the altitude difference. The cluster generating system 100 may then compare the altitude difference between the two points 104 to the predetermined height or predetermined height difference. In a case where the altitude difference is less than the predetermined height, the cluster generating system 100 may keep the edge between the two points 104. In a case where the altitude difference is equal to or exceeds the predetermined height, the cluster generating system 100 may discard the edge 106 between the two points 104.

In the example of the predetermined criterion including two points 104 having fields of view that have an overlapping portion and the overlapping portion is more than a predetermined value, the cluster generating system 100 may retain the edges 106 between two points 104 that have an overlapping portion that exceeds the predetermined value, and discard edges 106 connecting two points 104 that are equal to or less than the predetermined value. In such an example, the cluster generating system 100 compares the fields of view of the two points 104 and identifies if a portion of the field of view of one of the two points 104 is a portion of the field of view of the other of the two points 104, resulting in an overlap. In a case where there is no overlap, which means there is no portion of the field of view of one of the two points 104 that is visible in the field of view of the other of the two points 104, the cluster generating system 100 discards the edge 106 between the two points 104. In a case where there is an overlap, a portion of the field of view of the one of the two points 104 is visible in the field of view of the other of the two points 104. In such a case and as an example, the cluster generating system 100 may determine the size of the overlap compared to the size of the field of view. The cluster generating system may determine, as an example, that the size of the overlap exceeds the predetermined value, e.g., 70% of the intersection over union of the two fields of view, and thus, may retain the edge 106 between the two points 104. In a case where the overlap is less than the predetermined value, the cluster generating system 100 may discard the edge 106 between the two points 104.

FIGS. 1C-1D illustrate various stages of discarding edges 106 between points 104 that do not meet one or more of the predetermined criteria. FIG. 1D shows the resulting frame graph 108 with edges 106 connecting points 104 that meet the predetermined criteria. In summary, in one method, the cluster generating system 100 may initially connect each two points 104 based on the positioning of the points 104 relative to each other, and then, may retain and/or discard edges 106 connecting two points 104 based on characteristics of the points 104 and the relationship between the points 104. In another method, the cluster generating system 100 may connect all the points 104 to each other before determining which edges 106 to keep and which edges 106 to discard based on the characteristics of the points 104 and the relationship between the points 104. In another method, the cluster generating system 100 may connect the points 104 based on the points 104 meeting the predetermined criteria.

Figure 1E:
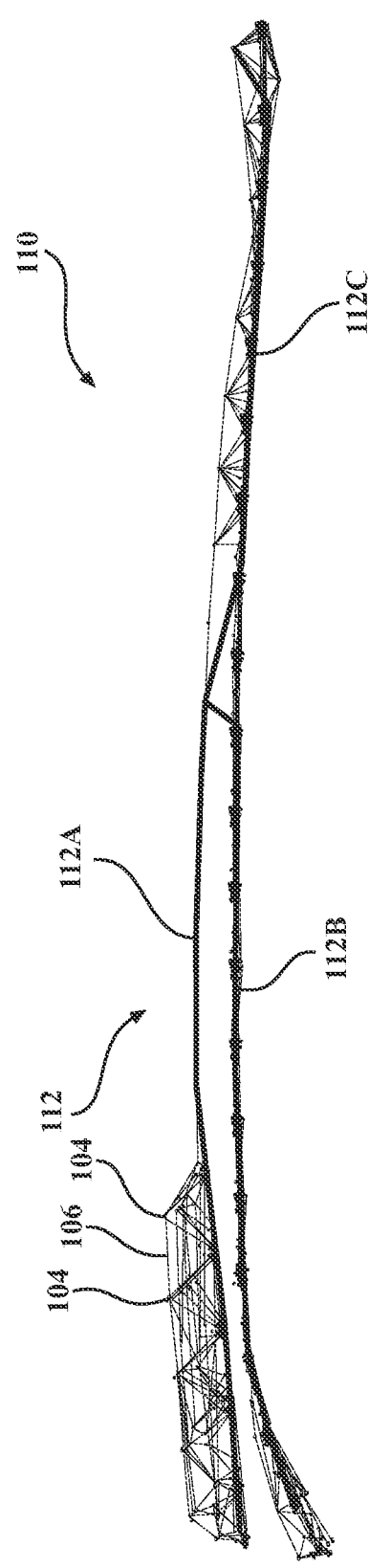

FIG. 1E illustrates an example of generating a road graph 110 based on the frame graph 108. The road graph 110 identifies one or more roadways 112A, 112B, 112C (collectively known as 112) in the region. As an example, the cluster generating system 100 may utilize an image skeletonization method to derive the road graph 110 from the frame graph 108. In such an example and as shown in FIG. 1E, the cluster generating system 100 may collapse the dense graph of points 104 and edges 106 into single lines identifying the roadways 112.

Figure 1F:
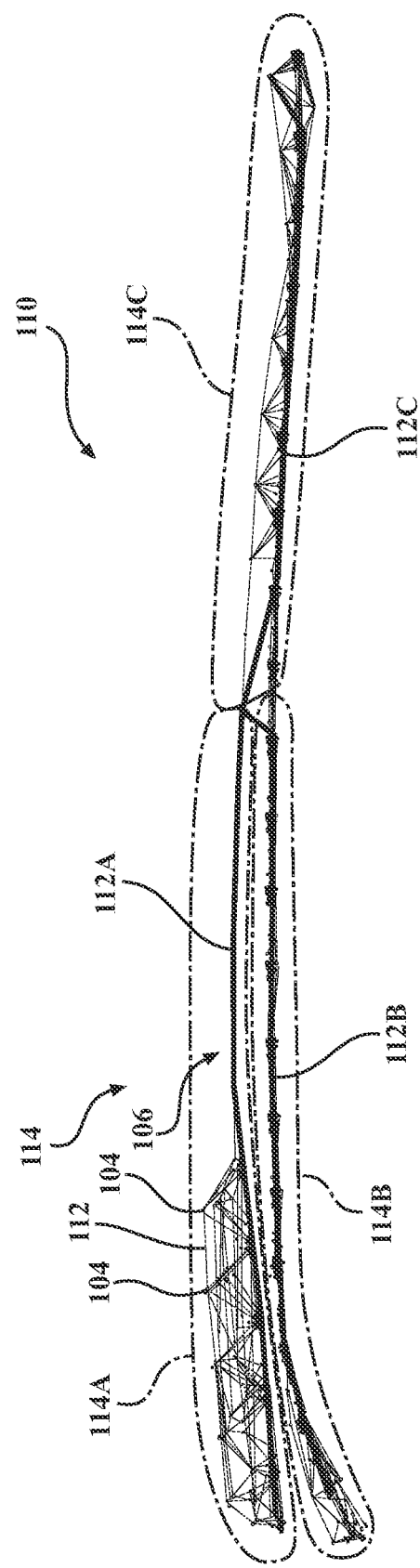

FIG. 1F illustrates an example of identifying different roadways 112 and grouping the points 104 into clusters 114A, 114B, 114C (collectively known as 114) based on at least one second predetermined criterion. Each cluster 114 is associated with one of the one or more roadways 112.

As an example, the cluster generating system 100 may utilize any algorithm or any suitable image processing method including any suitable machine learning methods and/or artificial learning techniques to identify the roadways 112 in the road graph 110. As an example, the cluster generating system 100 may identify each branch of the road graph 110 as a separate roadway 112. The cluster generating system 100 may then identify the closest roadway 112 to a point 104 and associate the point 104 to the closest roadway 112. The cluster generating system 100 may then group all the points 104 associated with that roadway 112 into one cluster 114. More generally and as previously mentioned, the cluster generating system 100 may group the points 104 into clusters 114 based on the second predetermined criterion. As an example, the second predetermined criterion may be proximity between the points 104 and one of the roadways 112.

Figure 2:
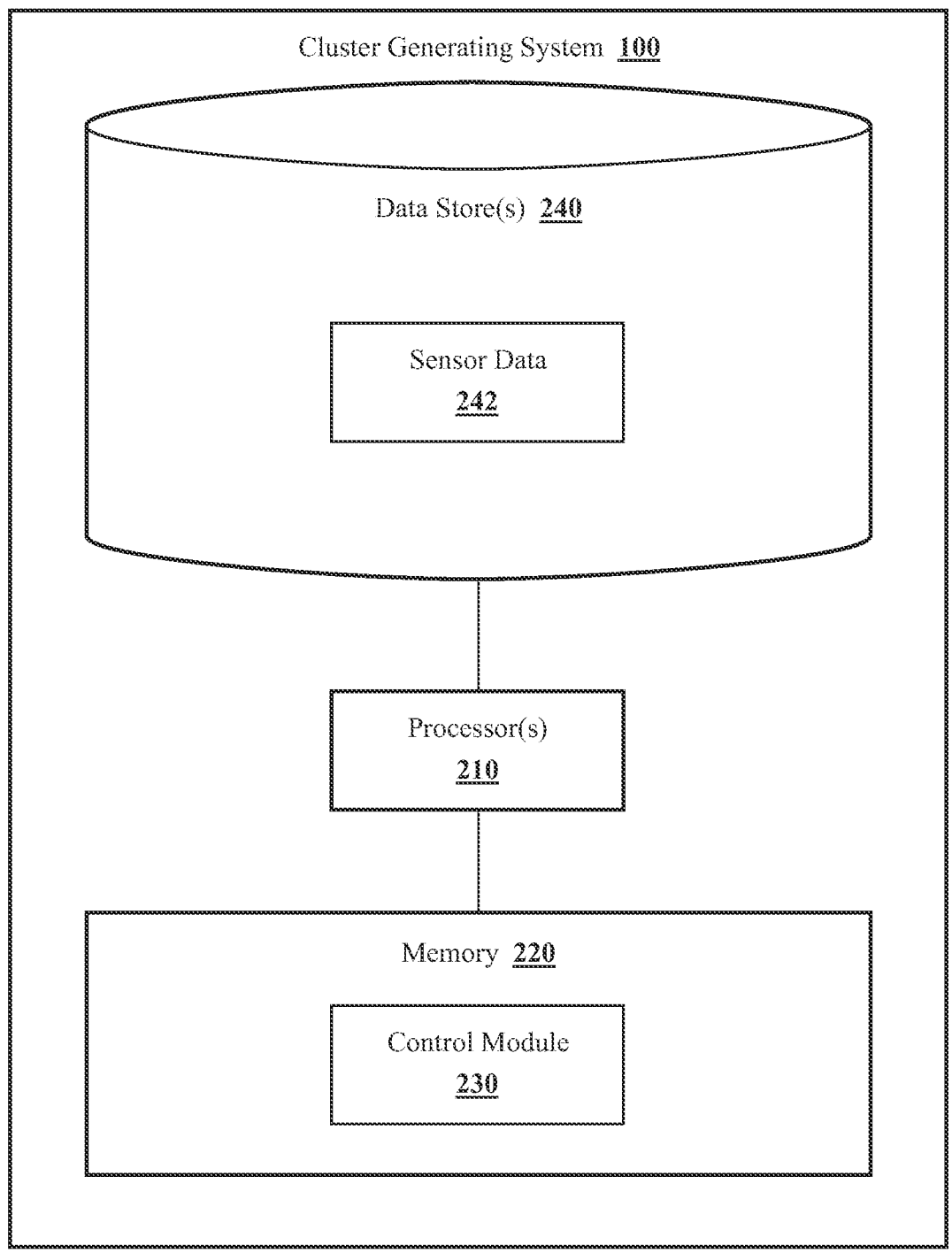
FIG. 2 illustrates one embodiment of the cluster generating system.

With reference to FIG. 2, one embodiment of the cluster generating system 100 of FIGS. 1A-1F is further illustrated. The cluster generating system 100 is shown as including a processor 210. Accordingly, the processor 210 may be a part of the cluster generating system 100 or the cluster generating system 100 may access the processor 210 through a data bus or another communication path. In one or more embodiments, the processor 210 is an application-specific integrated circuit (ASIC) that is configured to implement functions associated with a control module 230. In general, the processor 210 is an electronic processor, such as a microprocessor, which is capable of performing various functions as described herein.

In one embodiment, the cluster generating system 100 includes a memory 220 that stores the control module 230 and/or other modules that may function in support of grouping a plurality of points 104 into clusters 114 based on one or more roadways 112. The memory 220 is a random-access memory (RAM), read-only memory (ROM), a hard disk drive, a flash memory, or another suitable memory for storing the control module 230. The control module 230 is, for example, machine-readable instructions that, when executed by the processor 210, cause the processor 210 to perform the various functions disclosed herein. In further arrangements, the control module 230 is a logic, integrated circuit, or another device for performing the noted functions that includes the instructions integrated therein.

Furthermore, in one embodiment, the cluster generating system 100 includes a data store 240. The data store 240 is, in one arrangement, an electronic data structure stored in the memory 220 or another data store, and that is configured with routines that can be executed by the processor 210 for analyzing stored data, providing stored data, organizing stored data, and so on. Thus, in one embodiment, the data store 240 stores data used by the control module 230 in executing various functions.

For example, as depicted in FIG. 2, the data store 240 includes the sensor data 242 along with, for example, other information that is used and/or produced by the control module 230. The sensor data 242 includes information about the points 104 and may further include metadata related to the points 104. Vehicle sensors and/or any other suitable sensors may detect the points 104.

While the cluster generating system 100 is illustrated as including the various data elements, it should be appreciated that one or more of the illustrated data elements may not be included within the data store 240 in various implementations and may be included in a data store that is external to the cluster generating system 100. In any case, the cluster generating system 100 stores various data elements in the data store 240 to support functions of the control module 230.

In one embodiment, the control module 230 includes instructions that, when executed by the processor(s) 210, cause the processor(s) 210 to connect, using a plurality of edges 106, a plurality of points 104 in a region, based on at least one predetermined criterion, to form a frame graph 108. In one or more arrangements, the control module 230 receives the points 104 in the region. The control module 230 may then connect the points 104 to each other using edges 106 based on at least one predetermined criterion. As previously mentioned, the predetermined criterion may include two points 104 being neighbors, two points 104 being proximate to each other, and/or two points 104 being within a predetermined radius. As an example, the control module 230 may connect each two points 104 that are neighbors using an edge 106, forming the frame graph 108. Further, the predetermined criterion may include two points 104 having a common vehicle source, two points 104 having a distance from each other that is less than a predetermined distance, two points 104 having a gradient between each other that is less than a predetermined percentage, two points 104 having fields of view that have an altitude difference that is less than a predetermined height, and/or two points 104 having fields of view that have an overlapping portion and the overlapping portion is more than a predetermined value. Even further, the predetermined criterion may be two points 104 having a light level difference, a humidity level difference, a temperature level difference, and/or a precipitation difference that is less than a predetermined value. As an example, the predetermined criterion may be two points 104 having an environmental condition difference that is less than a measurable value. As previously mentioned, the control module 230 may connect all the points 104 that are neighbors using edges 106 and then, may remove the edges 106 between the points 104 that do not meet the predetermined criteria as detailed above. As another example, the control module 230 may connect the points 104 that meet the predetermined criteria using the edges 106.

In one embodiment, the control module 230 includes instructions that, when executed by the processor(s) 210, cause the processor(s) 210 to generate a road graph 110 based on the frame graph 108. As previously mentioned, the road graph 110 identifies one or more roadways 112 in the region. In one or more arrangements, the control module 230 may utilize any suitable method to extract the road graph 110 from the frame graph 108. As an example and as previously mentioned, the control module 230 may use an image skeletonization method to generate the road graph 110, which shows the one or more roadways 112.

In one embodiment, the control module 230 includes instructions that, when executed by the processor(s) 210, cause the processor(s) 210 to group one or more of the plurality of points 104 into one or more clusters 114 based on at least one second predetermined criterion. Each of the clusters 114 is associated with one of the roadways 112. As an example, the second predetermined criterion may be proximity between the one or more of the plurality of points 104 and the one or more roadways 112.

In one or more arrangements, the control module 230 may associate each of the points 104 with the roadway 112 closest to the point 104. The control module 230 may then group all the points 104 associated with the same roadway 112 together, forming a cluster 114.

In one embodiment, the control module 230 includes instructions that, when executed by the processor(s) 210, cause the processor(s) 210 to output the one or more clusters 114 to an entity. In one or more arrangements, the control module 230 may generate clusters 114 of points 104 and output the cluster 114 of points 104 in any suitable format to an entity such as a map database or a traffic database.

Figure 3:
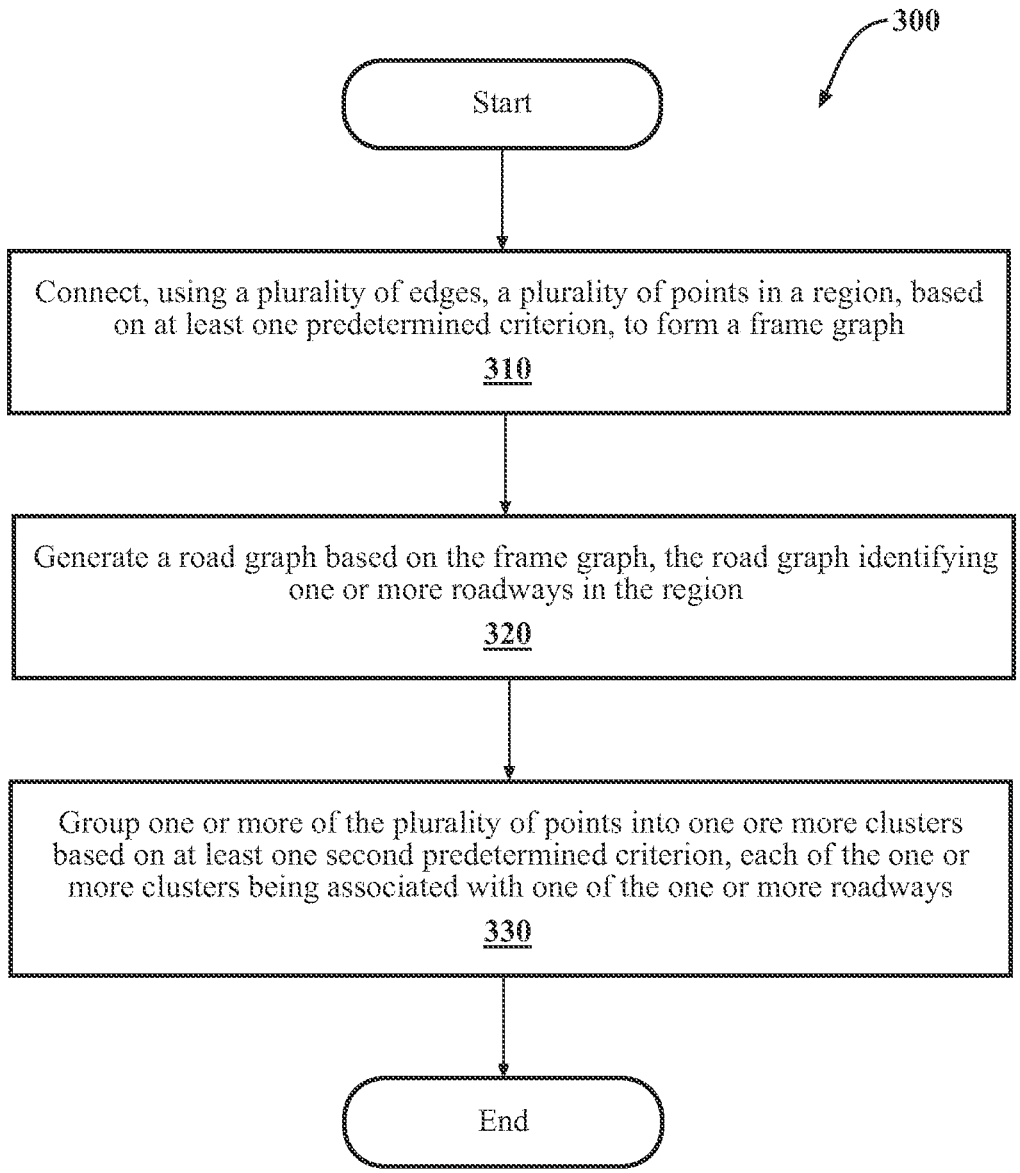
FIG. 3 is a flowchart illustrating one embodiment of a method associated with grouping a plurality of points into clusters based on one or more roadways.

FIG. 3 is a flowchart illustrating one embodiment of a method 300 associated with grouping a plurality of points 104 into clusters 114 based on one or more roadways 112. The method 300 will be described from the viewpoint of the cluster generating system 100. However, the method 300 may be adapted to be executed in any one of several different situations and not necessarily by the cluster generating system 100.

At step 310, the control module 230 may cause the processor(s) 210 to connect, using a plurality of edges 106, a plurality of points 104 in a region, based on at least one predetermined criterion, to form a frame graph 108. As previously mentioned, the control module 230 may connect the points 104 in the region based on one or more predetermined criteria. The one or more predetermined criteria include two points 104 being neighbors, two points 104 being proximate to each other, two points 104 being within a predetermined radius, two points 104 having a common vehicle source or a common sensor source, two points 104 having a distance from each other that is less than a predetermined distance, two points 104 having a gradient between each other that is less than a predetermined percentage, two points 104 having fields of view that have an altitude difference that is less than a predetermined height, and/or two points 104 having fields of view that have an overlapping portion and the overlapping portion is more than a predetermined value.

At step 320, the control module 230 may cause the processor(s) 210 to generate a road graph 110 based on the frame graph 108. As previously mentioned, the road graph 110 identifies the roadways 112 in the region. The control module 230 may apply any suitable algorithm or method such as image skeletonization to extract the road graph 110 from the frame graph 108.

At step 330, the control module 230 may cause the processor(s) 210 to group the points 104 into one or more clusters 114 based on at least one second predetermined criterion. As previously mentioned, each of the clusters 114 is associated with one of the roadways 112. The second predetermined criterion may be proximity between the points 104 and the roadways 112. The control module 230 may associate each point 104 with the closest roadway 112 and then, group points 104 associated with the same roadway 112 into a cluster of points 104. The control module 230 may then output the clusters 114 of points 104 to an entity such as a database in any suitable format.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a processor; and
a memory storing machine-readable instructions that, when executed by the processor, cause the processor to:
connect, using a plurality of edges, a plurality of points in a region, based on at least one predetermined criterion, to form a frame graph, the plurality of points being obtained from at least one of a mobile sensor or a stationary sensor;
generate a road graph based on the frame graph, the road graph identifying one or more roadways in the region;
group one or more of the plurality of points into one or more clusters based on at least one second predetermined criterion, each of the one or more clusters being associated with one of the one or more roadways; and
operate a vehicle based on the one or more clusters.

2. The system of claim 1, wherein the at least one predetermined criterion includes:
two of the plurality of points being neighbors;
two of the plurality of points being proximate to each other; and
two of the plurality of points being within a predetermined radius.

3. The system of claim 1, wherein the at least one predetermined criterion includes:
two of the plurality of points having a common vehicle source;
two of the plurality of points having a distance from each other that is less than a predetermined distance;
two of the plurality of points having a gradient between each other that is less than a predetermined percentage;
two of the plurality of points having fields of view that have an altitude difference that is less than a predetermined height; and
two of the plurality of points having fields of view that have an overlapping portion and the overlapping portion is more than a predetermined value.

4. The system of claim 1, wherein the at least one second predetermined criterion includes:
proximity between the one or more of the plurality of points and the one or more roadways.

5. The system of claim 1, wherein the machine-readable instructions further include instructions that when executed by the processor cause the processor to:
output the one or more clusters to an entity.

6. The system of claim 1, wherein each of the plurality of points is a position of a vehicle along a road when sensor data is being captured.

7. The system of claim 1, wherein each of the plurality of points is a centroid of a field of view of a sensor.

8. A method performed by a processor, the processor performing the steps of:
connecting, using a plurality of edges, a plurality of points in a region, based on at least one predetermined criterion, to form a frame graph, the plurality of points being obtained from at least one of a mobile sensor or a stationary sensor;
generating a road graph based on the frame graph, the road graph identifying one or more roadways in the region;
grouping one or more of the plurality of points into one or more clusters based on at least one second predetermined criterion, each of the one or more clusters being associated with one of the one or more roadways; and
operating a vehicle based on the one or more clusters.

9. The method of claim 8, wherein the at least one predetermined criterion includes:
two of the plurality of points being neighbors;
two of the plurality of points being proximate to each other; and
two of the plurality of points being within a predetermined radius.

10. The method of claim 8, wherein the at least one predetermined criterion includes:
two of the plurality of points having a common vehicle source;
two of the plurality of points having a distance from each other that is less than a predetermined distance;
two of the plurality of points having a gradient between each other that is less than a predetermined percentage;
two of the plurality of points having fields of view that have an altitude difference that is less than a predetermined height; and
two of the plurality of points having fields of view that have an overlapping portion and the overlapping portion is more than a predetermined value.

11. The method of claim 8, wherein the at least one second predetermined criterion includes:
proximity between the one or more of the plurality of points and the one or more roadways.

12. The method of claim 8, further comprising:
outputting the one or more clusters to an entity.

13. The method of claim 8, wherein each of the plurality of points is a position of a vehicle along a road when sensor data is being captured.

14. The method of claim 8, wherein each of the plurality of points is a centroid of a field of view of a sensor.

15. A non-transitory computer-readable medium including instructions that when executed by a processor cause the processor to:
connect, using a plurality of edges, a plurality of points in a region, based on at least one predetermined criterion, to form a frame graph, the plurality of points being obtained from at least one of a mobile sensor or a stationary sensor;
generate a road graph based on the frame graph, the road graph identifying one or more roadways in the region;
group one or more of the plurality of points into one or more clusters based on at least one second predetermined criterion, each of the one or more clusters being associated with one of the one or more roadways; and
operate a vehicle based on the one or more clusters.

16. The non-transitory computer-readable medium of claim 15, wherein the at least one predetermined criterion includes:
two of the plurality of points being neighbors;
two of the plurality of points being proximate to each other; and
two of the plurality of points being within a predetermined radius.

17. The non-transitory computer-readable medium of claim 15, wherein the at least one predetermined criterion includes:
two of the plurality of points having a common vehicle source;
two of the plurality of points having a distance from each other that is less than a predetermined distance;
two of the plurality of points having a gradient between each other that is less than a predetermined percentage;

two of the plurality of points having fields of view that have an altitude difference that is less than a predetermined height; and two of the plurality of points having fields of view that have an overlapping portion and the overlapping portion is more than a predetermined value.

18. The non-transitory computer-readable medium of claim 15, wherein the at least one second predetermined criterion includes:

proximity between the one or more of the plurality of points and the one or more roadways.

19. The non-transitory computer-readable medium of claim 15, wherein the instructions further include instructions that when executed by the processor cause the processor to:

output the one or more clusters to an entity.

20. The non-transitory computer-readable medium of claim 15, wherein each of the plurality of points is a position of a vehicle along a road when sensor data is being captured.

\* \* \* \* \*